(12) United States Patent
Serkh

(10) Patent No.: US 9,097,335 B2
(45) Date of Patent: Aug. 4, 2015

(54) CRANKSHAFT ISOLATING DECOUPLER

(71) Applicant: Gates Corporation, Denver, CO (US)

(72) Inventor: Alexander Serkh, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 133 days.

(21) Appl. No.: 13/952,886

(22) Filed: Jul. 29, 2013

(65) Prior Publication Data

US 2015/0027844 A1    Jan. 29, 2015

(51) Int. Cl.
   *F16H 55/36*   (2006.01)
   *F16D 41/20*   (2006.01)
   *F16D 7/02*    (2006.01)
   *F16D 13/76*   (2006.01)

(52) U.S. Cl.
   CPC ............... *F16H 55/36* (2013.01); *F16D 7/022* (2013.01); *F16D 13/76* (2013.01); *F16D 41/206* (2013.01); *F16D 2300/22* (2013.01); *F16H 2055/366* (2013.01)

(58) Field of Classification Search
   CPC .................... F16H 2055/306; F16H 2055/366
   See application file for complete search history.

(56) References Cited

U.S. PATENT DOCUMENTS

| 7,591,357 B2 | 9/2009 | Antchak et al. | |
| 2012/0015768 A1 | 1/2012 | Serkh | |
| 2012/0298474 A1* | 11/2012 | Ward et al. | 192/41 S |
| 2014/0008175 A1* | 1/2014 | Schneider et al. | 192/41 S |

FOREIGN PATENT DOCUMENTS

| DE | 102009052611 A1 | 5/2011 |
| WO | 2012061936 A1 | 5/2012 |

OTHER PUBLICATIONS

European Patent Office, International Search Report, mailing date Dec. 3, 2014.

* cited by examiner

*Primary Examiner* — Richard Lorence
(74) *Attorney, Agent, or Firm* — Jeffrey A. Thurnau, Esq.; Paul N. Dunlap, Esq.

(57) ABSTRACT

An isolating decoupler comprising a hub for connection to a driving shaft, a pulley journalled to the hub, the pulley having a belt engaging surface, a spring engaged between the hub and a spring carrier, the spring radially expandable in a loading direction, a one-way clutch spring disposed radially inward of the spring engaged with the spring carrier and frictionally engagable with the pulley in a loading direction that is opposite the loading direction of the spring, the one-way clutch spring engagable with the hub whereby the frictional engagement of the one-way clutch spring with the pulley can be progressively released in an unloading direction, and an inertial member engaged with the hub through a damping member.

16 Claims, 6 Drawing Sheets

CRANKSHAFT ISOLATING DECOUPLER

FIELD OF THE INVENTION

The invention relates to an isolating decoupler comprising a wrap spring disposed radially inward of a torsion spring engaged with a spring carrier and frictionally engagable with a pulley in a loading direction that is opposite that of the torsion spring, the wrap spring engagable with the hub whereby the frictional engagement with the pulley can be released.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 7,591,357 which discloses a decoupler provided for transferring rotary movement between an engine driven crankshaft and a serpentine belt. The decoupler has a rotary driving member and a rotary driven member coaxially mounted with the driving member for relative rotary movement therewith. A decoupling assembly extends between the driving member and the driven member. The decoupling assembly selectively couples the driving and driven members when the driving member rotates relative to the driven member in a first coupling sense. The decoupling assembly uncouples the driving member from the driven, member when the driving member rotates relative to the driven member in a second sense opposite the first sense. A torsional vibration damper is mounted for rotation with one of the driving and driven members to cancel some of the vibrations generated by the engine.

What is needed is an isolating decoupler comprising a wrap spring disposed radially inward of a torsion spring engaged with a spring carrier and frictionally engagable with a pulley in a loading direction that is opposite that of the torsion spring, the wrap spring engagable with the hub whereby the frictional engagement with the pulley can be released. The present invention meets this need.

SUMMARY OF THE INVENTION

The primary aspect of the invention is an isolating decoupler comprising a wrap spring disposed radially inward of a torsion spring engaged with a spring carrier and frictionally engagable with a pulley in a loading direction that is opposite that of the torsion spring, the wrap spring engagable with the hub whereby the frictional engagement with the pulley can be released.

Other aspects of the invention will be pointed out or made obvious by the following description of the invention and the accompanying drawings.

The invention comprises an isolating decoupler comprising a hub for connection to a driving shaft, a pulley journalled to the hub, the pulley having a belt engaging surface, a spring engaged between the hub and a spring carrier, the spring radially expandable in a loading direction, a one-way clutch spring disposed radially inward of the spring engaged with the spring carrier and frictionally engagable with the pulley in a loading direction that is opposite the loading direction of the spring, the one-way clutch spring engagable with the hub whereby the frictional engagement of the one-way clutch spring with the pulley can be progressively released in an unloading direction, and an inertial member engaged with the hub through a damping member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
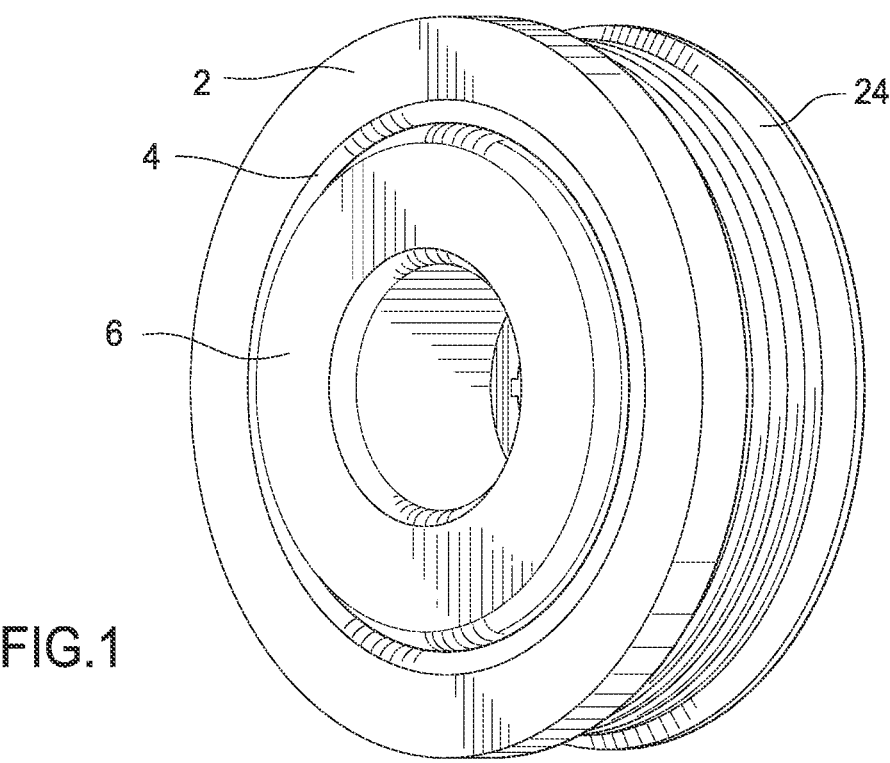
FIG. 1 is a front of the device.

FIG. 1 is a front view of the device. The device comprises a hub 6, inertial member 2 and a pulley 24. Hub 6 can be used to attach the device to an engine crankshaft (not shown). Damper 4 is disposed between hub 6 and inertial member 2. Damper 4 comprises an elastomeric material suitable for damping oscillations of the inertial member. Pulley 24 has a profile suitable for engaging a power transmission belt, for example, a v-belt or multi-ribbed belt. Inertial damper 4 damps crankshaft oscillations caused by the engine cylinder firing events.

Figure 2:
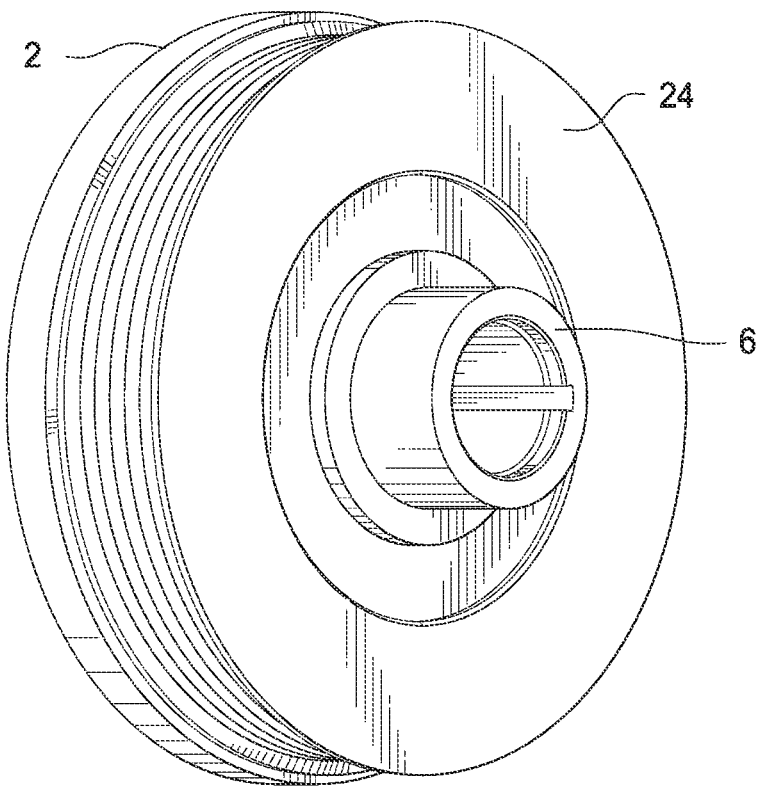
FIG. 2 is a back view of the device.

FIG. 2 is a back view of the device. The diameter of inertial member 2 is approximately the same as the diameter of pulley 24, thereby rendering the device compact.

Figure 3:
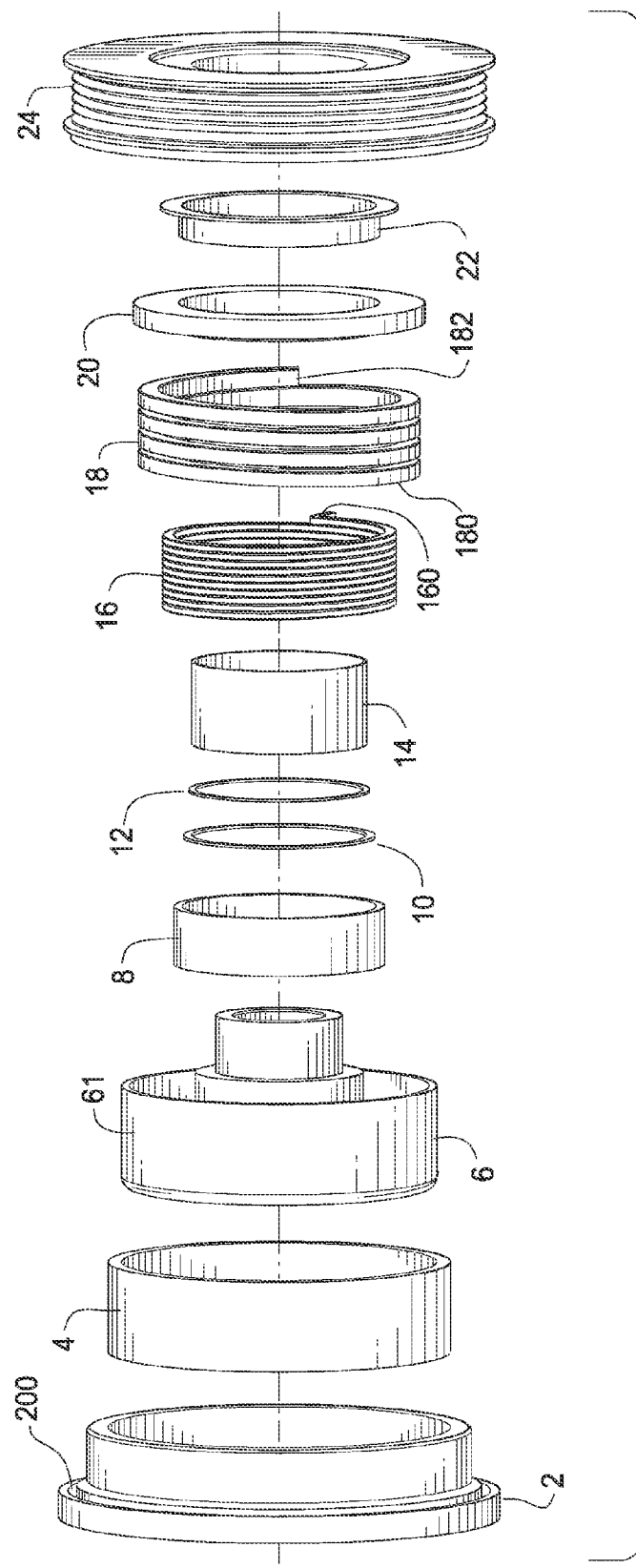
FIG. 3 is an exploded, view of the device.

FIG. 3 is an exploded view of the device. Hub 6 comprises an outer cylindrical portion 61 and radial portion 62. An end 180 of torsion spring 18 is engaged with a stop 65 on radial portion 62. The other end 182 of torsion spring 18 engages clutch carrier 20. Clutch carrier 20 is journalled to pulley 24 on a bushing 22. Bushing 22 engages an inner cylindrical portion 240 of pulley 24.

An end 160 of wrap spring 16 engages clutch carrier 20. The other end 161 of wrap spring 16 is temporarily engageable with hub 6, see FIG. 5. Sleeve 8 is press fit to cylindrical portion 240. Cylindrical portion 240 is journalled to hub 6 through a bushing 14. Wrap spring 16 comprises a coil spring.

Retaining ring 12 engages groove 63 in hub 6. Thrust washer 10 bears upon ring 12, thereby retaining sleeve 8 and pulley 24 in position on hub 6. Sleeve 8 and pulley 24 are journalled to hub 6 through bushing 14. In an alternate embodiment, bushing 14 may be replaced with ball bearings, needle bearings, roller bearings or any other suitable bearing known in the art.

Carrier 20 with bushing 22 are installed on the outer diameter of the pulley portion 240, and each are thereby retained in place by sleeve 8. Carrier 20 and bushing 22 can freely rotate relative to the pulley 24. Sleeve 8 is press fit onto the pulley portion 240. Thrust washer 10 is installed between sleeve 8 and retaining ring 12 thereby retaining pulley 24 on the hub 6. Pulley 24 can axially move relative to hub 6 only in the amount of the clearances between retaining ring 12, thrust washer 10, groove 63 in hub 6 for retaining ring 12 and space between sleeve 8 and pulley portion 240.

Figure 6:
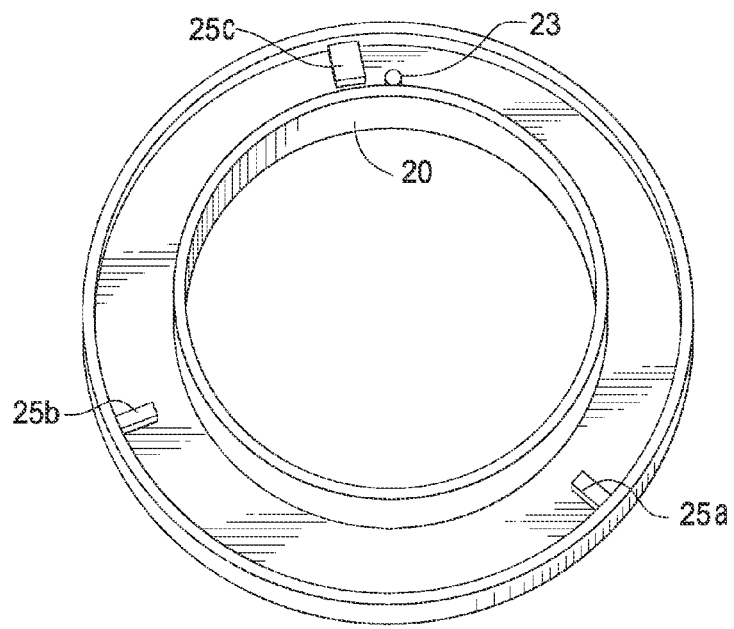
FIG. 6 is a detail of the clutch carrier.

Wrap spring 16 is wound around hub 21 of carrier 20 with end 160 fixed against a tab 23, see FIG. 6. Wrap spring 16 uses about two or three coils to frictionally lock wrap spring 16 about hub 21 of carrier 20. Wrap spring end 160 and clutch carrier 20 are not moveable relative to each other due the connection. Wrap spring 16 is radially inward of torsion spring 18, thereby disposed between the torsion spring 18 and the hub 6. Wrap spring 16 is radially disposed between torsion spring 18 and pulley 24.

Clutch carrier 20 receives torsion spring 18. During operation torsion spring 18 is loaded in the unwinding direction, meaning the coils tend to radially expand under load. Wrap spring 16 is installed onto sleeve 8 with an interference fit, that is, the difference in diameter between, an inside diameter of the wrap spring and the outside diameter of the sleeve are dimensionally different which causes an interference which is approximately 0.3 mm to 0.5 mm. The material for sleeve 8 is selected to suitably support the wrap spring during locking and overrunning modes.

Figure 4:
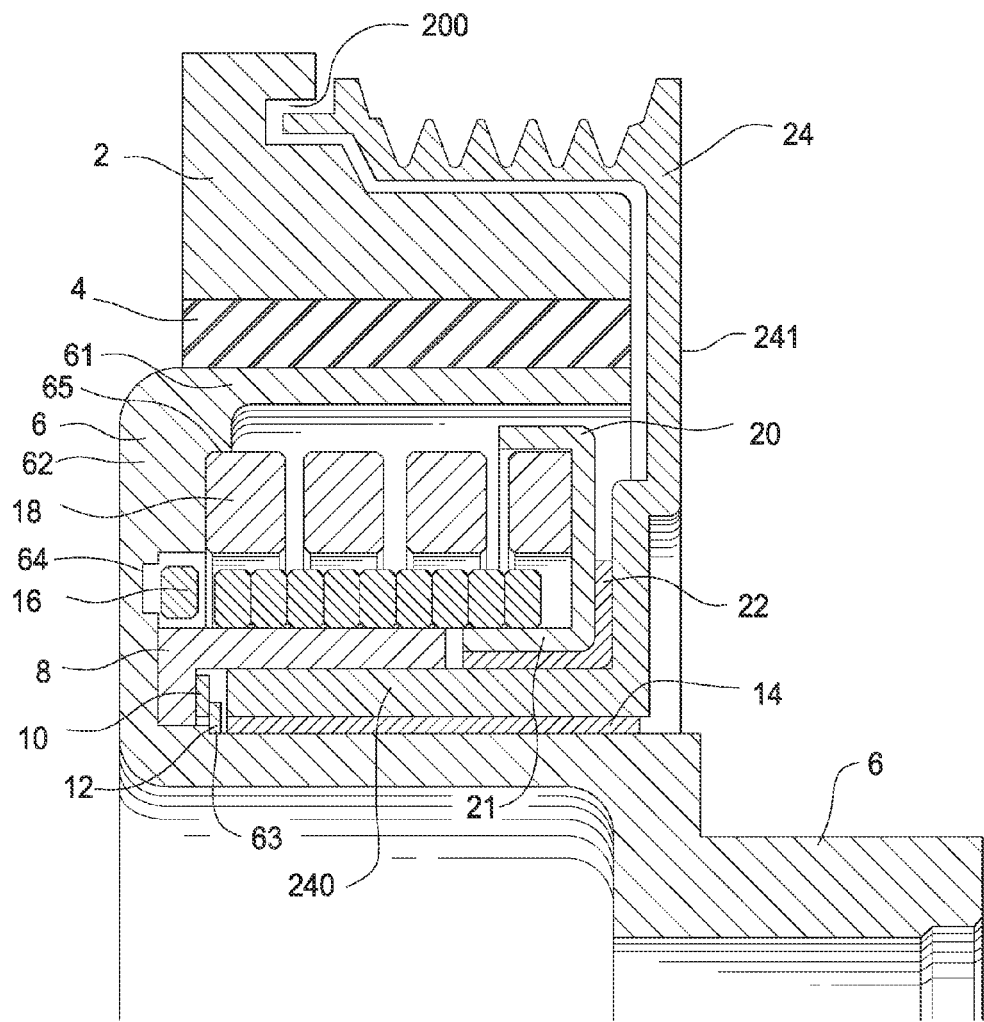
FIG. 4 is a cross-section of the device.

FIG. 4 is a cross-section of the device. When torque is applied to hub 6, for example by an engine crankshaft (not shown), torsion spring 18 is loaded in the unwinding direction, thereby driving clutch carrier 20. Loading in the unwinding direction means torsion spring 18 increases in radial diameter as the coils of the torsion spring expand. In turn clutch carrier 20 winds wrap spring 16 about sleeve 8. Wrap spring 16 is loaded in the direction opposite that of the torsion spring, that is, wrap spring 16 is loaded in the winding direction. Loaded in the winding direction means spring 16 tends to decrease in radial diameter as the coils are loaded. As the load increases wrap spring 16 grips sleeve 8 by a progressively increasing frictional engagement which is caused by the sequential engagement of the wrap spring coils about sleeve 8. The grip of wrap spring 16 causes sleeve 8 and thereby pulley 24 to rotate in unison with nub 6. In this operating condition there is little or no relative motion between clutch carrier 20 and pulley 24, although some oscillation may be present due to load variations.

When the engine decelerates the crankshaft speed is slowed, wherein pulley 24 may temporarily rotate faster than hub 6 due to inertia in the belt drive system driven by the belt which engages pulley 24 (belt system not shown). In the deceleration condition pulley 24 and sleeve 8 temporarily rotate faster than hub 6 and wrap spring 16. This causes wrap spring 16 to unwind which causes wrap spring 16 to radially increase in diameter which releases the frictional grip with sleeve 8. This allows pulley 24 to temporarily overrun hub 6. During the overrun condition bushing 14, thrust washer 10, and bushing 22 all experience some relative motion.

Figure 5:
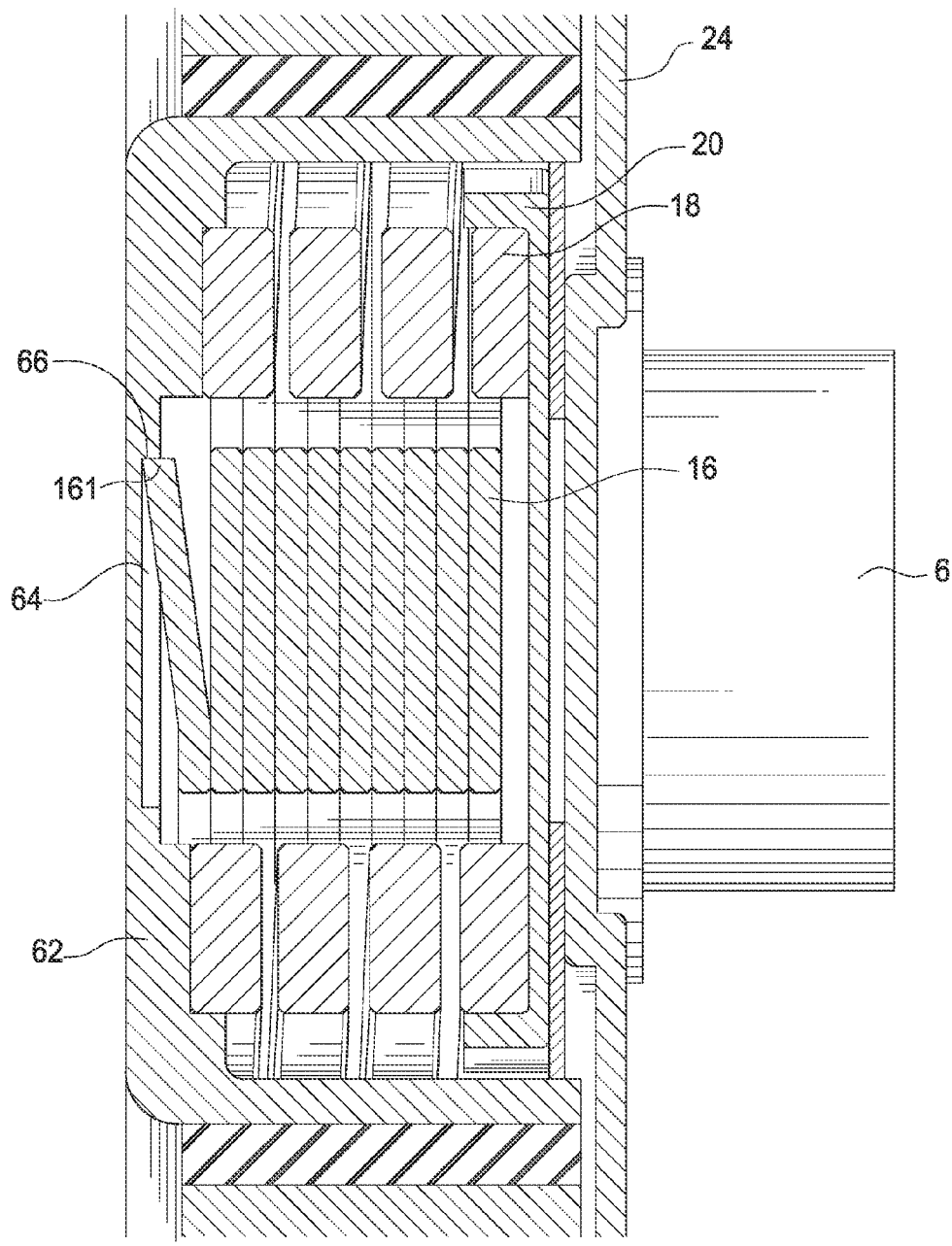
FIG. 5 is a cross-section showing a wrap spring connection to the hub.

FIG. 5 is a cross-section showing a wrap spring connection to the hub. If during operation the loading torque on torsion spring 18 exceeds a predetermined magnitude then hub 6 will continue to angularly advance relative to pulley 24. In doing so, end 66 of wrap spring grove 64 will come into contact with end 161 of wrap spring 16 (FIG. 5). This contact causes wrap spring 16 to partially unwind as the load increases, thereby partially expanding the radial diameter of wrap spring 16. Partial unwinding of wrap spring 16 progressively releases the force of the frictional engagement ("grip") with sleeve 8 and pulley 24 as the input torque increases, for example during extreme engine acceleration. The partial release of the grip of wrap spring 16 allows hub 6 to partially overrun pulley 24, thereby allowing excessive torque to bleed off. This limits further loading thereby protecting the device and the components driven by the device from possible damage from overload conditions.

FIG. 6 is a detail of the clutch carrier. Clutch carrier 20 comprises portions 25a, 25b, 25c which support the volutes of torsion spring 18. Each portion 25a, 25b, 25c is of a different height relative to the clutch carrier in order to support the helical form of the wrap spring. End 160 of wrap spring 16 engages member 23. Portion 25c also functions as a torsion spring stop. Torsion spring end 182 bears upon torsion spring stop 25c during operation.

Figure 7:
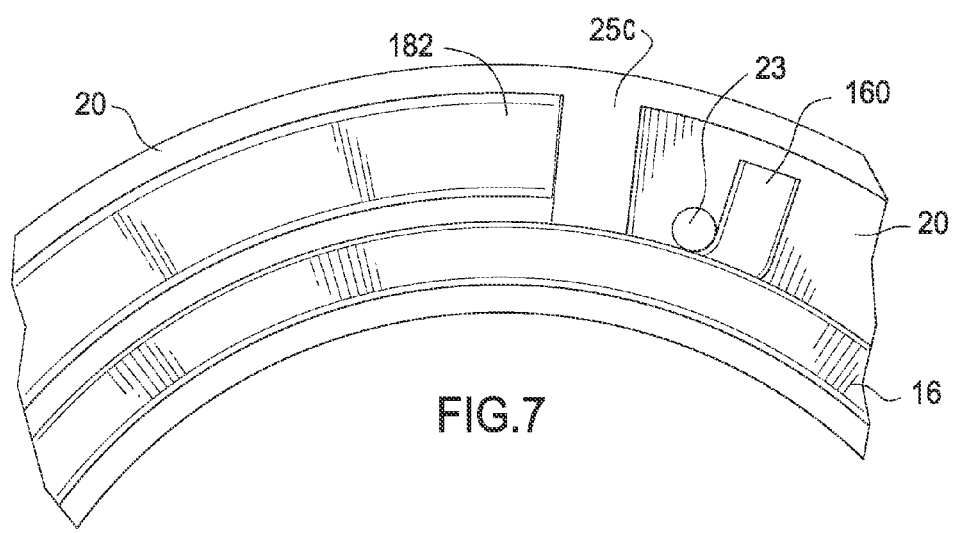
FIG. 7 is a detail of the clutch carrier.

FIG. 7 is a detail of the clutch carrier. End 182 of torsion spring 18 engages stop 25c in a driving condition. End 160 of wrap spring 16 is engaged with member 23.

Figure 8:
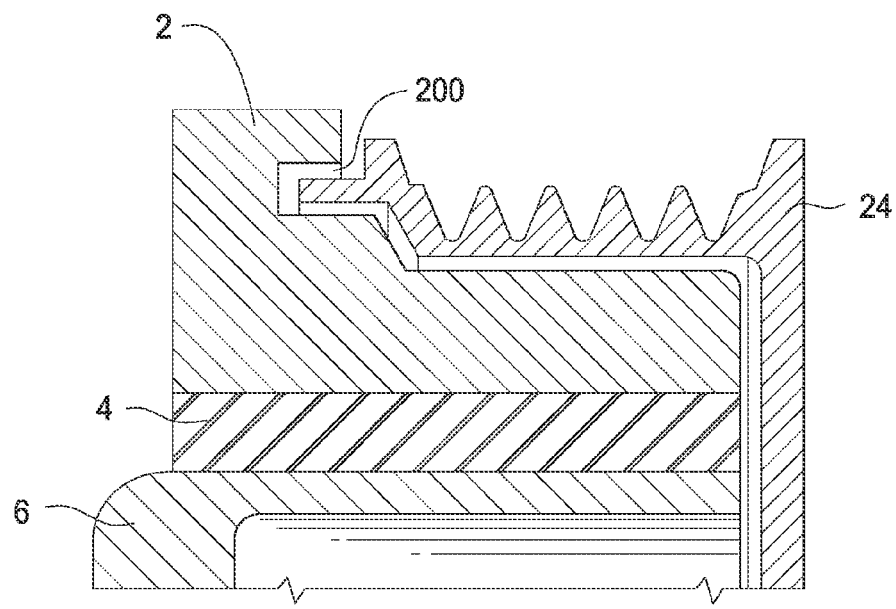
FIG. 8 is a detail of the torsional vibration damper.

FIG. 8 is a detail of the torsional vibration damper. Debris channel 200 allows debris to exit the device between the damper 2 and pulley 24. The labyrinth form of channel 200 discourages debris from entering the space between the damper and pulley.

Figure 9:
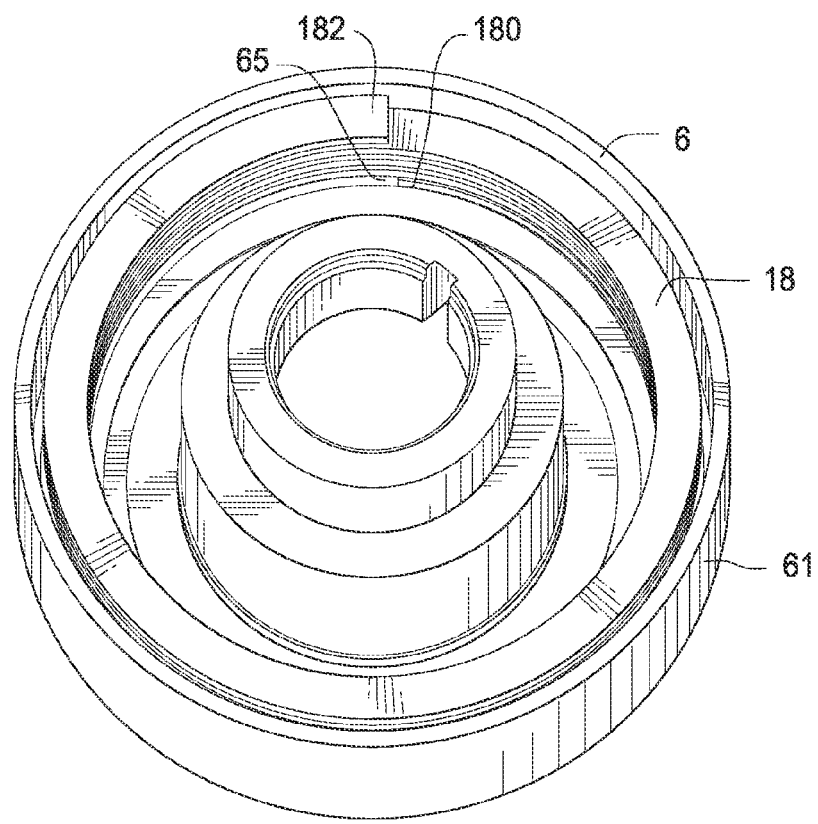
FIG. 9 is a detail of the hub and torsion spring.

FIG. 9 is a detail of the hub and torsion spring. End 180 of torsion spring 18 engages a stop 65 on hub 6. During operation torsion spring 18 is loaded in the unwinding direction causing end 180 to bear upon stop 65.

Advantages of the device include the pulley is connected to the wrap spring and the bearing support and inertia are located primarily within the envelope of the device. A further advantage of the invention is that wrap spring 16 can carry a substantially higher load compared to a like wrap spring loaded in an unwinding direction. For example, the wrap spring disclosed in U.S. Pat. No. 7,591,357 has to be selected based on material strength and rigidity so the wrap spring will keep its form and shape under compression (the unwinding direction). If not properly designed at certain loads the prior art wrap spring can "buckle". On the other hand the wrap spring in the invention is only subject to tension during loading which allows a substantially higher stress.

Although a form of the invention has been described herein, it will be obvious to those skilled in the art that variations may be made in the construction and relation of parts without departing from the spirit and scope of the invention described herein.

I claim:

1. An isolating decoupler comprising:
   a hub for connection to a driving shaft;
   a pulley journalled to the hub, the pulley having a belt engaging surface;
   a spring engaged between the hub and a spring carrier, the spring radially expandable in a loading direction;
   a one-way clutch spring disposed radially inward of the spring engaged with the spring carrier and frictionally engagable with the pulley in a loading direction that is opposite the loading direction of the spring;
   the one-way clutch spring engagable with the hub whereby the frictional engagement of the one-way clutch spring with the pulley can be progressively released in an unloading direction; and
   an inertial member engaged with the hub through a damping member.

2. The isolating decoupler as in claim 1, wherein the damping member comprises elastomeric material.

3. The isolating decoupler as in claim 1, wherein the pulley is journalled to the hub on a bushing.

4. The isolating decoupler as in claim 1, wherein the spring is loaded in the unwinding direction.

5. The isolating decoupler as in claim 1, wherein the one-way clutch spring is loaded in the winding direction.

6. The isolating decoupler as in claim 1, wherein the spring comprises a torsion spring.

7. The isolating decoupler as in claim 1, wherein the one-way clutch spring comprises a coil spring.

8. An isolating decoupler comprising:
a hub for connection to a driving shaft;
a pulley journalled to the hub, the pulley having a belt engaging surface;
a torsion spring engaged between the hub and a spring carrier, the torsion spring loaded in an unwinding direction;
a one-way clutch spring disposed radially inward of the torsion spring engaged with the spring carrier and frictionally engagable with the pulley in a loading direction that is opposite the loading direction of the torsion spring;
the one-way clutch spring engagable with the hub whereby the force of the frictional engagement of the one-way clutch spring with the pulley progressively decreases as the load increases beyond a predetermined level; and
an inertial member engaged with the hub through a damping member.

9. The isolating decoupler as in claim 8, wherein the one-way clutch spring is loaded in a winding direction.

10. The isolating decoupler as in claim 8, wherein the pulley comprises a multi-ribbed belt engaging surface.

11. An isolating decoupler comprising:
a hub;
a pulley journalled to the hub, the pulley having a belt engaging surface;
a torsion spring engaged between the hub and a spring carrier, the torsion spring loaded in an unwinding direction when operated in a driving direction;
a one-way clutch spring disposed radially inward of the torsion spring engaged with the spring carrier and frictionally engagable with the pulley;
the frictional engagement of the one-way clutch spring with the pulley progressively decreases as the load increases beyond a predetermined level; and
an inertial member engaged with the hub through a damping member.

12. The isolating decoupler as in claim 11, wherein the damping member comprises elastomeric material.

13. The isolating decoupler as in claim 11, wherein the pulley is journalled to the hub on a bushing.

14. The isolating decoupler as in claim 11, wherein the torsion spring is loaded in the unwinding direction.

15. The isolating decoupler as in claim 11, wherein the one-way clutch spring is loaded in the winding direction.

16. The isolating decoupler as in claim 11, wherein the one-way clutch spring comprises a coil spring.

* * * * *